Jan. 23, 1934.   P. L. DOUNIS ET AL   1,944,501
JACKING AND SIDEWISE MOTION TRANSMITTING DEVICE FOR AUTOMOTIVE VEHICLES
Filed April 10, 1931   2 Sheets-Sheet 1
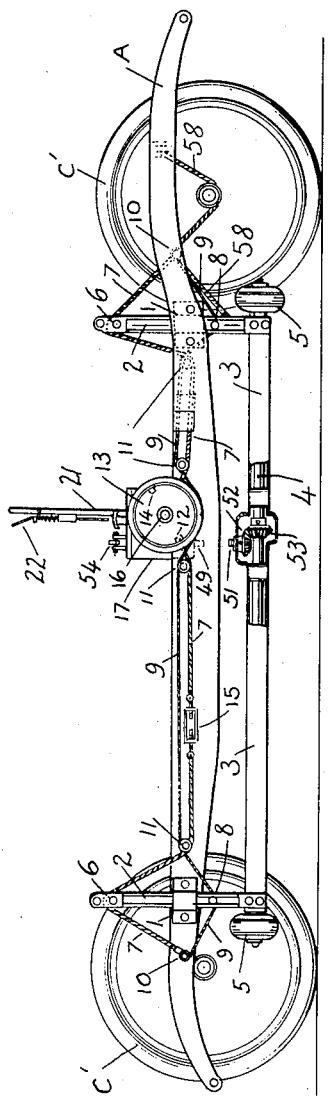
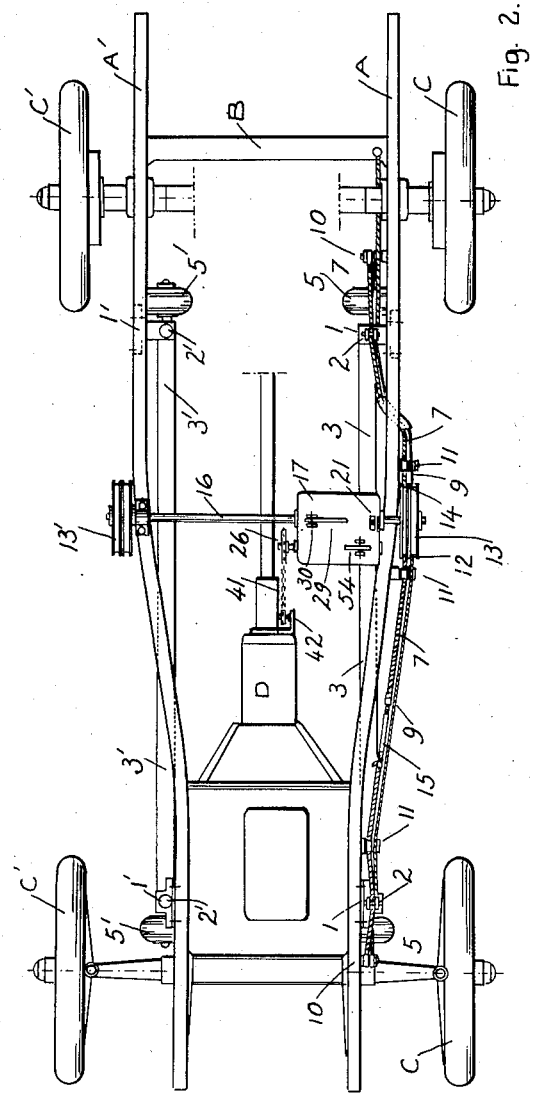
Inventors
Peter L. Dounis
A. Jordanoglou Jan. 23, 1934. P. L. DOUNIS ET AL 1,944,501
JACKING AND SIDEWISE MOTION TRANSMITTING DEVICE FOR AUTOMOTIVE VEHICLES
Filed April 10, 1931 2 Sheets-Sheet 2

Inventors
Peter L Dounis
Al. Jordanoglou

Patented Jan. 23, 1934

1,944,501

UNITED STATES PATENT OFFICE 1,944,501

JACKING AND SIDEWISE MOTION TRANSMITTING DEVICE FOR AUTOMOTIVE VEHICLES

Peter L. Dounis and Alexander Jordanoglou, Washington, D. C.

Application April 10, 1931. Serial No. 529,272

11 Claims. (Cl. 180—1)

Our invention relates to an improvement in jacking up and sidewise motion transmitting device for automotive vehicles and the objects of our improvement are, first, to provide a mechanism fitting into every make of automobile vehicle with the smallest possible change in its general layout and manufacturing process; second, to make the said mechanism easily controlled from the seat of the operator and operated either automatically or by hand; third, to facilitate manœuvering of the vehicle for purposes of repairing, storing, parking, loading or unloading in narrow streets, excavating, tilling, etc., where sidewise motion is very desirable to eliminate the usual time consuming and laborious manœuvering of such vehicles; fourth, to make low the cost of construction and maintenance of such mechanism by using the smallest possible number of parts and making it compact and solid; fifth, to minimize any strain that such mechanism might induce on the members of the frame of the chassis.

We attain these objects by the mechanism illustrated in the accompanying drawings, in which—

Figure 1 is a side elevation of a chassis of an automobile equipped with this invention and after removal of the wheels of the right hand side;

Figure 2 is a plan view of the same;

Figure 4:
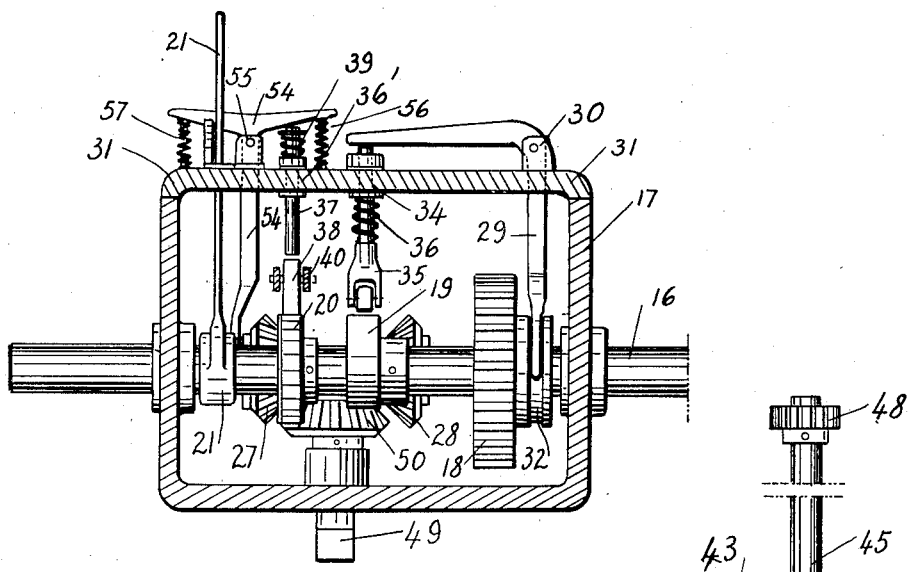
Figure 4 is a vertical sectional view taken on the line a—a of Figure 3.

Referring to the drawings in detail and particularly to Figures 1 and 2, A and A' indicate the side members of the frame of the chassis of an automobile, B indicates the cross-members of the same, C indicates the wheels, and D, a standard form of gear transmission.

Four guides 1 are secured to the side members A and A' rigidly or through heavy coil springs. The lower ends of the slides 2, under the side member A, are connected by a channel 3 in which is housed the shaft 4, driving the wheels 5, secured at its ends.

The lower ends of the slides 2' under the side member A' support rotatably wheels 5'. These slides may or may not carry a channel.

On the upper end of each slide 2, is a hole 6, through which passes a wire cable 7. Also, in the middle of each slide 2, there is a hole 8, through which passes a wire cable 9.

One end of each cable 7, is secured, preferably resiliently at 10, on each side member. The other end is passed through the hole 6, and over guide pulleys 11, as indicated in Figures 1 and 2, and it is finally attached at 12, on the drum 13.

The wire cable 9, which is thinner than the cable 7, is secured to the same aforesaid point 10, on the side members, passes through the hole 8, and over guide pulleys it is brought and attached at 14, diametrically opposite the point 12 of the drums 13.

Tension regulating means are interposed in the cables as indicated by 15 in Figures 1 and 2.

The two drums 13 (Fig. 2) are secured at the ends of a cross shaft 16, whose bearings are on the sides of the gear housing 17, and on the side member A'. The said housing 17 is mounted on the frame by proper mountings, which may be or may not be resilient.

The part of the cross shaft 16, which is housed in the housing 17 (Fig. 3), carries a gear 18 splined thereon, a cam 19, a ratchet lock 20, and a lever 21, which is provided with a latch 22 (Fig. 1).

Figure 3:
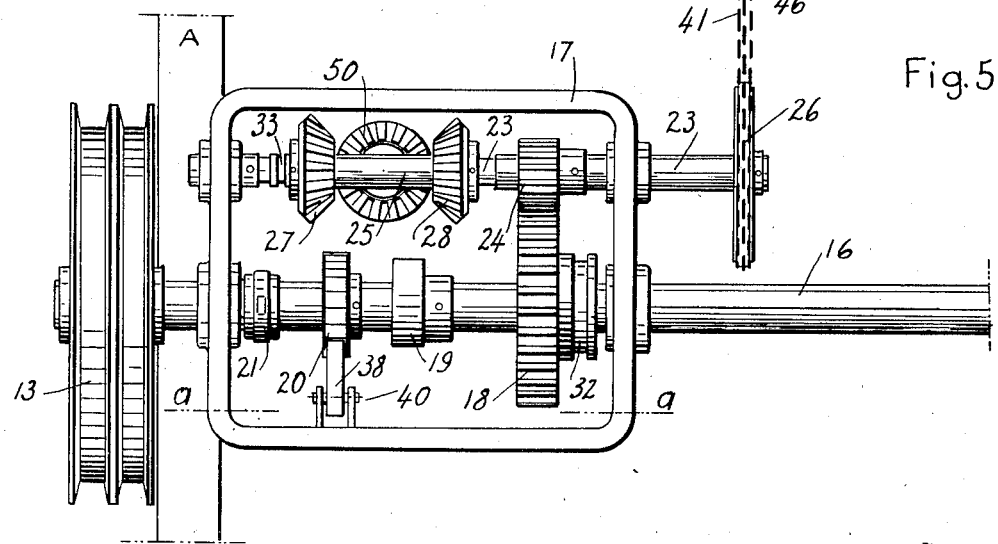
Figure 3 is a plan view of the mechanism as it appears after the removal of the cover.

In the housing 17 is included also the shaft 23, which carries the gear 24, the sleeve 25 splined thereon, this shaft 23 extending outside the housing carries the sprocket wheel 26 (Fig. 3).

On the aforesaid sleeve 25 are secured rigidly two bevel gears, 27 and 28.

A T-shaped lever 54 (Fig. 4) pivots on the point 55 of the cover 31. Its lower end located in the housing is bifurcated and straddles in a groove, 33 (Fig. 3), of the sleeve 25. Two springs, 56 and 57, positioned under the arms of the aforesaid lever 54 retain it in a fixed position, corresponding to such a position of the sleeve 25 in which both bevel gears 27 and 28 are out of mesh with the gear 50.

The gear 18 is thrown in or out of mesh with the gear 24 by a bent lever 29 (Fig. 4), whose pivot 30 is on the cover 31 of the housing 17. One arm of the said lever 29 is bifurcated and straddles on a groove 32 in the hub of the gear 18. Its other arm outside of the housing comes in contact with the follower 35, which extends through the hole 34 of the cover 31. A coiled spring 36 pushes the follower 35 against the cam 19.

Through the hole 36' of the cover 31 emerges the plunger 37, which is guided by the said hole 36' for operative engagement with the tail of the pawl 38. This latter cooperates with the corresponding ratchet wheel 20. By means of a coiled spring 39 the plunger 37 is normally retained out of contact with the pawl 38 which is pivoted on the point 40 in the housing 17.

Figure 5:
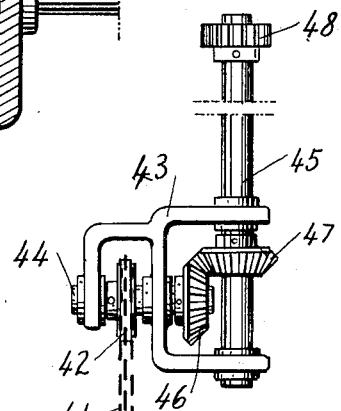
Figure 5 is a plan view of the power take-off attachment.

The sprocket wheel 26 is connected by a chain 41 with the sprocket wheel 42 of the power take-off attachment, Fig. 5. This attachment consists of a bracket 43 adapted to be attached to the end plate of the ordinary transmission case D of the automotive vehicle. It supports two shafts 44 and 45 at right angles to each other, the shaft 45 driving the shaft 44 thru the bevel gears 46 and 47, or thru a worm and worm-wheel. The shaft 45 enters into the transmission case D and it carries a pinion 48, which is adapted to mesh with the low speed gear of the counter-shaft whenever the normal gear shifting lever of the vehicle is in its neutral position.

The applicants do not wish to limit their mode of connecting the power take-off attachment to the counter-shaft to that described above, which is intended for mere purpose of illustration. For example, in instances where the counter-shaft projects beyond the end plate of the transmission case and is provided with attaching means the pinion 48 may be eliminated and the shaft 45 be directly connected to the counter-shaft thru the attaching means.

Into the housing 17 and under the bevel gears 27 and 28 is the vertical hub shaft 49 on the upper end of which is attached the bevel gear 50. The lower end of the same is connected by means of a flexible shaft, or by a telescopic shaft and universal joints, with the upper end of the stub shaft 51, (Fig. 1), supported on the channel 3 and carrying on its lower end the bevel gear 52 which meshes with the bevel gear 53 secured to the driving shaft 4.

It is to be understood that the location of the housing 17, and of the guides 1, may be changed to suit the construction of the frame of the particular type of vehicle on which said device may be used.

*Operation of the machine*

From the above description it is obvious that when the vehicle is stopped motion is transmitted to the shaft 23 thru the power take-off attachment, the chain 41, and the sprocket wheel 26.

Then, if the operator wants to jack up the vehicle, first he unlocks the lever 21 thereby causing the sliding elements to drop until the wheels 5 engage the ground. Next he disengages the usual vehicle transmission clutch and presses on the horizontal arm of the lever 29, thus throwing into mesh the gears 18 and 24 and causing shaft 16 to rotate.

During the rotation of the shaft 16 the cables 7 are wound on the drums 13, causing relative movement between the slides 2 and the frame of the vehicle, which results in raising the car bodily off the ground; at the same time, cables 9 are unwound on the drums a length equal to the wound length of cables 7.

The rotation of shaft 16 is automatically stopped when the cam 19, through the rod 35, raises the horizontal arm of the bent lever 29 and throws the gear 18 out of mesh with gear 24. The configuration of the cam is such as to stop the motion of shaft 16 when the vehicle has been raised to the desired height. The retaining pawl 20 prevents the shaft 16 from recoiling under the weight of the vehicle.

At the same time, cables 58, one end of each of which is attached to the frame of the vehicle the other end passing under the axle and through a guiding pulley 10, and which is brought and attached at a convenient point on the slide 2, are pulled by the jacking up motion and thus prevent the sagging of the main springs when the vehicle has been raised.

The sidewise motion is obtained in either direction by pressing on either arm of the T-shaped lever 54 (Fig. 4) which throws into mesh either of the bevel gears 27—28 with the bevel gear 50, which transmits rotation to the wheels 5 through a flexible shaft, or a telescopic shaft with universal joints, the bevel gears 52 and 53 and the driving shaft 4.

The sidewise motion automatically stops when the pressure on the arm of the aforesaid lever 54 has been relieved. This is done by the aid of the springs 56 and 57 placed under the arms of the lever 54. This arrangement automatically shifts the sleeve 25 and throws either of the gears 27 and 28 out of mesh with the gear 50. The ratio of the gears 46—47, 27, 28—50, 52—53, is such that the speed given to the ground wheels, relative to the speed of the counter-shaft, is greatly reduced, and consequently the stopping of the sidewise motion is practically instantaneous with the disengagement of shaft 51 from its driving means. However, brakes of any well known type may be used for controlling the sidewise movement of heavy vehicles, if it is found desirable.

During any shifting of the gears for the above mentioned manœuvering it is advisable to disengage the usual clutch of the vehicle transmission, as it is done when a shifting of the gears regularly takes place.

The car is brought to its normal position on the ground by applying pressure to the rod 37 which is thereby made to engage and press down the tail of the ratchet 38, causing its disengagement with ratchet wheel 20. Under the weight of the vehicle the shaft 16 reverts and the vehicle is brought again on its ground wheels C, C'. In order to prevent an abrupt lowering of the vehicle proper braking device, depending on the weight and the make of the car, will be used. It is preferable that the braking device be controlled by the pawl actuating rod 37 so that the braking force will be automatically applied immediately after the disengagement of the pawl and ratchet means.

Then the operator, by manipulating the lever 21, raises the jack until the wheels 5, 5' are at a predetermined clearance from the ground and then he locks the lever 21 in place by the latch 22.

In the case of a heavy vehicle the jack may be lifted by reversing the cross-shaft 16 automatically through mechanical means by providing the housing with additional reversing means for that purpose.

The above described mechanism could be modified to be used only for jacking up the vehicle either automatically or by hand. In this latter case the following parts will be used: The jacks with base plates, the wire cables 7 and 9, the drums 13, the cross-shaft 16 with its bearings on the side members of the frame and a sector with a worm rotating the said shaft 16. In the former case the channels 3, the axle 4, the wheels 5, the bevel gears 52, 53, 50, 27, and 28, the sleeve 25, and the lever 54 will be omitted.

It is obvious that the parts of the cables 7 and 9, between the jacks and the drums, could be substituted by steel rods. Also the wire cables can be protected and guided by tubings.

From this description it becomes clear that our improvement provides simple and reliable means for jacking up and transmitting sidewise motion with the smallest possible strain on the chassis because of the suppleness of the wire cable and the resilient attachment of it on the frame. Moreover, it is adaptable for every make of vehicle, without or with slight changes in its general layout.

Having thus described our invention, what we claim as new is:

1. A jacking and sidewise motion transmitting device for automotive vehicles, including a jack carried by the vehicle and provided with vertically slidable means carrying at their lower ends ground wheels, driving means for the ground wheels including a housing, a shaft mounted therein transversely of the vehicle and adapted to be driven by the counter-shaft of the vehicle, and a second shaft driven by the first shaft for imparting sliding movement to the slidable means, the second shaft carrying drums, means connected to the drums and actuated thereby for sliding the said slidable means and means for driving the ground wheels from the transversely mounted shaft.

2. A jacking and sidewise motion transmitting device for automotive vehicles, including a jack carried by the vehicle and comprising two sets of vertically slidable means carrying at their lower ends ground wheels, driving means for said ground wheels of one of the sets including a housing, a shaft mounted therein adapted to be driven by the counter-shaft of the vehicle, and a second shaft driven by the first shaft for imparting sliding movement to the slidable means, the second shaft carrying at its ends drums, and cables connected thereto and to the slidable means for imparting sliding movement to the latter.

3. A jacking and sidewise motion transmitting device for automotive vehicles, including a jack carried by the vehicle and comprising two sets of vertically slidable means carrying at their lower ends ground wheels, driving means for said ground wheels of one of the sets including a housing, a shaft mounted therein and adapted to be driven by the counter-shaft of the vehicle, a second shaft driven by the first shaft for imparting sliding movement to the slidable means, the second shaft carrying at each of its ends drums, two pairs of cables connected to each of said slidable means and to each of said drums for vertically and simultaneously sliding the said slidable means.

4. A jacking and sidewise motion transmitting device for automotive vehicles, including a jack carried by the vehicle and comprising two sets of vertically slidable means carrying at their lower ends ground wheels, driving means for said ground wheels of one of the sets including a housing, a shaft mounted therein and adapted to be driven by the countershaft of the vehicle, a second shaft driven by the first shaft for imparting sliding movement to the slidable means, the second shaft carrying at each of its ends drums, two pairs of cables connected to each of slidable means and to each of said drums for vertically and simultaneously sliding the said slidable means, the second shaft being provided with means for automatically stopping the movement of the slidable elements.

5. A jacking device for automotive vehicles comprising two vertically slidable elements adapted to be mounted on opposite sides of the vehicle frame, each element consisting of a longitudinal member, ground wheels carried thereby, slides mounted on said member at right angles thereto, a shaft extending transversely of the frame, and means actuated by said shaft for effecting sliding movement of the elements to thereby lower or raise the vehicle, one of the longitudinal members including a shaft for driving the ground wheels carried thereby and instrumentalities actuated through the vehicle transmission for driving both of the shafts.

6. In a jacking and sidewise motion transmitting device for automotive vehicles vertically slidable elements carrying ground wheels, means for driving said wheels and effecting sliding movement to said elements, including a housing, two shafts mounted in said housing, one of the shafts being driven from the countershaft of the ordinary vehicle transmission, the other shaft carrying a slidable gear, drums at the opposite ends thereby, a gear fixed on the first shaft adapted to drive the second shaft through said slidable gear, means actuated by said drums for effecting the sliding movement for the elements, and means carried by the first shaft for driving the ground wheels.

7. In a jacking and sidewise motion transmitting device for automotive vehicles vertically slidable elements carrying ground wheels, means for driving said wheels and effecting sliding movement to said element including a housing, two shafts mounted in said housing, one of the shafts being driven from the countershaft of the ordinary vehicle transmission, the other shaft carrying a slidable gear, drums at the opposite ends thereby, a gear fixed on the first shaft adapted to drive the second shaft through said slidable gear, means actuated by said drums for effecting the sliding movement for the elements, and means carried by the first shaft for driving the ground wheels, the second shaft being also provided with a ratchet wheel and a cam, a pawl co-operating with said ratchet wheel for preventing rotation of the second shaft in one direction and means actuated by the cam for disengaging the said gears and thereby interrupt rotation of the second shaft.

8. A jacking device for automotive vehicles comprising two vertically slidable elements adapted to be mounted on opposite sides of the vehicle frame, each element consisting of a longitudinal member, ground engaging means carried thereby, slides mounted on said member at right angles thereto, a shaft extending transversely of the frame, and means actuated by said shaft for effecting the sliding movement of the elements to thereby lower or raise the vehicle, and means preventing the sagging on the main springs of the raised vehicle, said means including cables having one end fixed to the chassis of the vehicle the other end fixed on the slidable elements and extending lengthwise of the vehicle.

9. A jacking and sidewise motion transmitting device for automotive vehicles, including a jack carried by the vehicle and provided with vertically slidable means for raising and lowering the vehicle from and to the ground and carrying at their lower ends ground wheels, driving means for said ground wheels, and means preventing the sagging on the main springs of the raised vehicle, said means including cables having one end fixed to the chassis of the vehicle, the other end fixed on the slidable elements and an intermediate portion passing under one of the wheel axles of the vehicle.

10. A jacking and sidewise motion transmitting device for automotive vehicles including a jack, carried by the vehicle and comprising two sets of vertically slidable elements, ground wheels carried thereby, driving means for said ground wheels, and a set of cable means for each slidable element extending lengthwise of the vehicle adapted to effect the sliding movement of said elements.

11. A jacking and sidewise motion transmitting device for automotive vehicles, including a jack carried by the vehicle and provided with vertically slidable means carrying at their lower ends ground wheels, driving means for the ground wheels including a housing, a shaft mounted therein, transversely of the vehicle, and a second shaft driven by the first shaft for imparting sliding movement to the slidable means, the second shaft carrying drums, means connected to the drums and actuated thereby for sliding the said slidable means, and means for driving the ground wheels from the transversely mounted shaft.

PETER L. DOUNIS.
AL. JORDANOGLOU.